United States Patent [19]

Kramer et al.

[11] Patent Number: 4,799,645

[45] Date of Patent: Jan. 24, 1989

[54] PILOT OPERATED HYDRAULIC CONTROL VALVE

[75] Inventors: Kenneth D. Kramer; Gregory E. Sparks, both of Waterloo, Iowa

[73] Assignee: Deere & Company, Moline, Ill.

[21] Appl. No.: 145,345

[22] Filed: Jan. 19, 1988

[51] Int. Cl.[4] .............................................. F16K 31/40
[52] U.S. Cl. .................................. 251/30.04; 251/38; 251/50; 251/36
[58] Field of Search ................... 251/30.03, 30.04, 36, 251/38, 47, 50

[56] References Cited

U.S. PATENT DOCUMENTS

| | | | |
|---|---|---|---|
| 1,764,366 | 6/1930 | Stuebing | 251/36 |
| 1,989,341 | 1/1935 | Shenton . | |
| 2,575,272 | 11/1953 | Harris . | |
| 2,659,197 | 11/1953 | Halford et al. | 251/30.04 X |
| 2,672,888 | 3/1954 | Shields | 251/36 |
| 2,673,706 | 3/1954 | Matteson . | |
| 2,687,869 | 8/1954 | Kanuch . | |
| 2,964,286 | 12/1960 | Hoskins . | |
| 3,033,228 | 5/1982 | Mohler | 251/30.04 X |
| 3,079,952 | 3/1963 | Miller | 137/625.49 |
| 3,154,285 | 10/1964 | Houle | 251/30.04 |
| 3,903,919 | 9/1975 | Zeuner | 137/489 |
| 4,113,174 | 9/1978 | Kagiyama et al. | 251/38 |
| 4,304,264 | 12/1981 | McClintock et al. | 137/630.13 |
| 4,494,726 | 1/1985 | Kumar et al. | 231/30.04 |
| 4,526,340 | 7/1985 | Kolchinsky et al. | 251/38 |
| 4,679,765 | 7/1987 | Kramer et al. | 251/38 |
| 4,699,351 | 10/1987 | Wells | 251/36 X |

FOREIGN PATENT DOCUMENTS 211709 10/1940 Switzerland ............... 251/30.04

Primary Examiner—John Rivell

[57] ABSTRACT

A pilot operated control valve includes a spool type pilot valve member which is coupled to the main valve member by a pair of springs so that both pilot pressure forces and spring forces act on the main valve member. The main valve member and the housing in which it moves enclose a damping chamber. A damping orifice extends through the main valve member and connects the damping chamber with a pilot pressure chamber to reduce vibration of the main valve member.

15 Claims, 1 Drawing Sheet

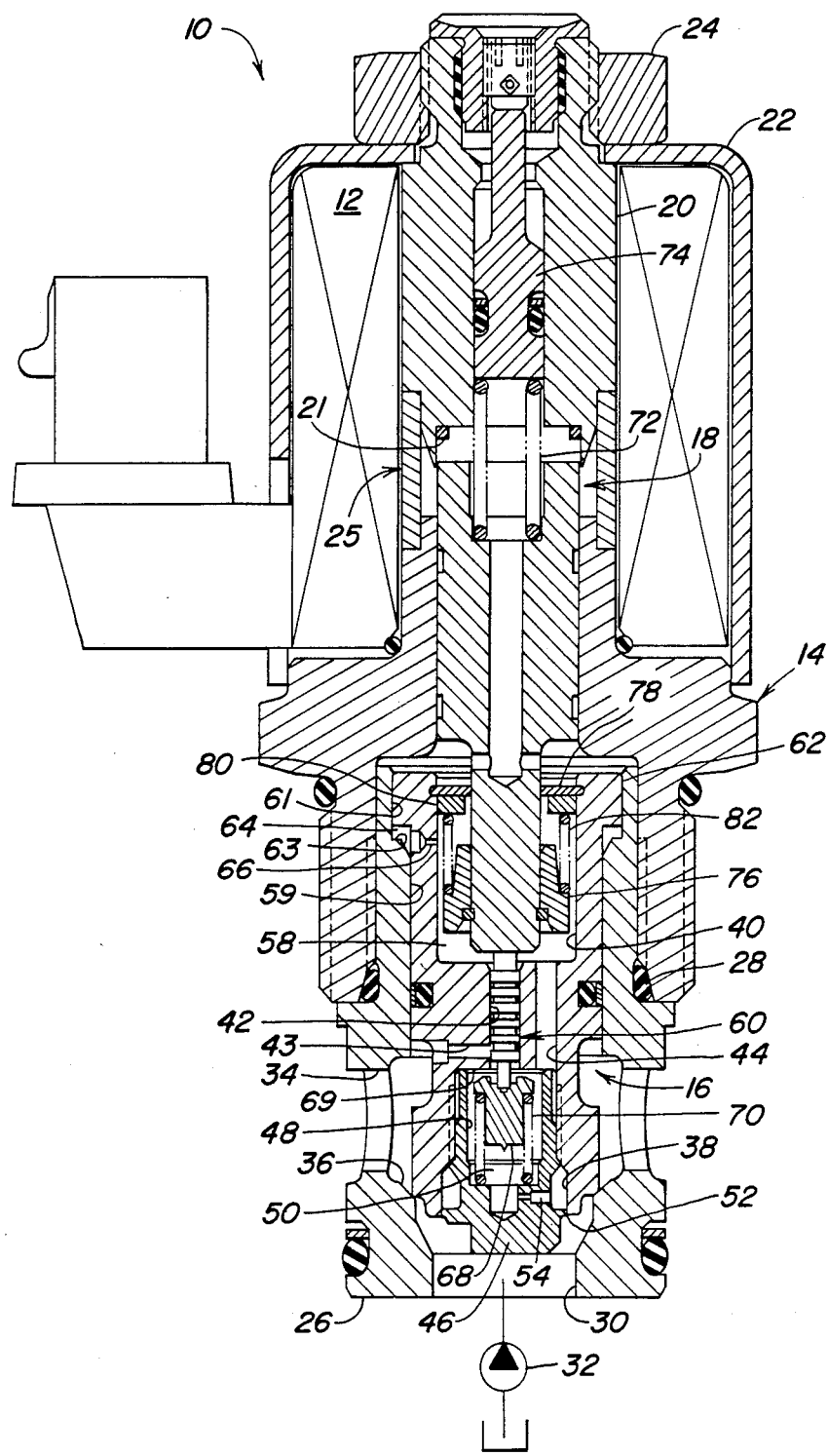

PILOT OPERATED HYDRAULIC CONTROL VALVE

BACKGROUND OF THE INVENTION

This invention relates to a solenoid-operated, pilot-controlled control valve.

Typically, hydraulically coupled (2-stage) valves require a flow induced pressure drop across the pilot stage in order to overcome seal drag and spring bias on the main valve stage to cause the main valve stage to open. One application for such valves would be as a control valve to control the raising and lowering of a conventional agricultural tractor hitch via a large area hydraulic cylinder. However, when such a hitch is not carrying any weight, a low pressure, low flow condition can arise wherein the flow would be insufficient to produce the pressure drop required for proper operation of the control valve.

SUMMARY OF THE INVENTION

An object of this invention is to provide a two-stage, pilot operated control valve with improved low pressure operation.

A further object of the present invention is to provide such a valve wherein high frequency vibrations of the main valve member are reduced.

These and other objects are achieved by the present invention which provides a pilot operated hydraulic control valve with a pilot valve member which is coupled to the main valve member by a pair of springs so that the fluid pressure pilot forces are augmented by mechanical spring forces. The valve includes a damping chamber, the volume of which varies upon movement of the main valve member. The damping chamber is communicated to a pilot pressure chamber by a damping orifice to reduce high frequency vibration of the main valve member.

BRIEF DESCRIPTION OF THE DRAWING

The figure is a cross-sectional view of a hydraulic control valve constructed according to the present invention.

DETAILED DESCRIPTION

A solenoid-operated orifice control valve 10 includes a coil 12 and a hollow housing base 14 surrounding a valve member 16 and an armature 18. Other housing-related parts include a hollow cap 20 and a cover 22 which is retained on cap 20 by nut 24. The minimum air gap between armature 18 and cap 20 is established by non-magnetic stop ring 21. The base 14 and cap 20 are spaced apart by a hollow cylindrical bushing 25. A hollow housing sleeve 26 is received by base 14 and is threadably and sealingly connected thereto by O-ring seal 28. The housing base 14, the armature 18, the cap 20 and the cover 22 are made of ferro-magnetic material, while parts 21, 25 and 60 are made of non-magnetic material, such as stainless steel.

The sleeve 26 forms an inlet 30 for connecting to a source of fluid pressure, such as pump 32, and an outlet 34 for connecting to a fluid-operated device such as a hydraulic cylinder (not shown). The sleeve 26 forms an annular main valve seat 36 between inlet 30 and outlet 34.

The valve member 16 is movable in the sleeve 26 and is engageable with the main seat 36 to control fluid flow from inlet 30 to outlet 34. Blind bores 38 and 40 extend axially into valve member 16 from opposite ends thereof. A central axial passage 42 and a separate parallel axial passage 44 extend between bores 38 and 40. A radial passage 43 connects passage 42 with the outer surface of valve member 16 and with outlet 34.

Bore 38 threadably receives a plug 46 which has a blind bore 48 therein which opens away from inlet 30. Plug 46 and valve member 16 enclose an inlet chamber 50. An annular land 52 is located near the outer end of plug 46. An orifice 54 extends radially into plug 46 adjacent land 52 and communicates blind bore 38 and inlet chamber 50 with inlet 30 past land 52. There is a predetermined annular clearance between land 52 and the wall of bore 38. The radial width of this clearance is preferably less than the diameter of the metering orifice 54 so that particles which would otherwise plug orifice 54 are instead trapped by land 52. The total cross-sectional area of this annular clearance is much larger than the area of orifice 54 so that many particles can be trapped without significantly effecting fluid communication between inlet 30 and orifice 54.

The valve member 16, the housing 14 and the armature 18 enclose a pilot chamber 58. A spool type pilot valve member 60 extends axially from armature 18 through passage 42 to an end which projects into chamber 50. The pilot valve member 60 carries a plurality of lands. The lowermost land (viewing the figure) cooperates with the wall of passage 42 to open and close communication between outlet 34 and inlet chamber 50 via a portion of passage 42. The remaining lands cooperate with the wall of passage 42 to prevent communication between passage 43 and outlet 34 and the pilot chamber 58 via the portion of passage 42 above its intersection with passage 43.

The sleeve 26 includes a small diameter bore portion 59 and a large diameter portion 61 joined by an annular shoulder 63. The main body of valve member 16 slidably engages the wall of bore portion 59. The valve member 16 includes a flange 62 at one end which slidably and sealingly engages a larger bore portion 61. Together, the sleeve 26 and the valve member 16 enclose a damping chamber 64. A damping orifice 66 extends radially through valve member 16 and communicates chamber 64 with chamber 58, thereby fluidically damping the movement of valve member 18 within sleeve 26 as movement of valve member 16 varies the volume of chamber 64 and causes fluid to flow through orifice 66.

Spring guide 68 is received in chamber 50 and engages an end of pilot valve member 60 and is engageable with axially facing end wall 69 of blind bore 38. A spring 70 engages a shoulder on guide 68 and an axially facing end wall of plug 46.

A spring 72 engages armature 18 and a spring adjusting piston 74. Springs 72 and 70 are biased to urge (via armature 18, pilot valve member 60 and plug 46) the valve member 16 towards engagement with seat 36. A hollow spring guide 76 receives armature 18, is located within pilot chamber 58, and is coupled for movement with armature 18. An annular spring retainer 78 is received in a groove near the outer end of bore 40 and engages an annular spring stop 80. Spring 82 engages guide 76 and stop 80 and resiliently couples valve member 16 to pilot valve member 60 so that a mechanical force tending to move valve member 16 away from seat 36 will be transmitted to valve member 16 when solenoid 12 is energized to move armature 18 upwardly, viewing the figure. Similarly, when the armature 18 moves downwardly, spring 70 transmits a force to plug 46 and valve member 16 tending to move valve member 16 downwardly along with armature 18 and pilot valve member 60.

Preferably, spring 70 will be stiffer than spring 82 and will have a higher preload when in the solenoid off-/valve closed position shown so that upon initial energization of solenoid 12 the pilot spool 60 will easily move relative to main valve member 16 to open radial passage 43 and begin pilot pressure control of the main valve member 16. The stiffness and preload of spring 72 is chosen to achieve a desired current/displacement relationship and to achieve positive valve closing when solenoid 12 is not energized. By way of example, spring 70 has a spring constant of 4 newtons per milimeter and a preload force of 20 newtons. Spring 72 has a spring constant of 15.24 newtons per milimeter and preload force of 7.23 newtons. Spring 82 has a spring constant of 1.04 newtons per milimeter and preload force of 12.77 newtons. It is understood each of these values could be varied to achieve different valve operating characteristics.

When solenoid 12 is energized, the armature 18, pilot valve member 60 and spring guide 68 move upwards as spring 70 extends and spring 82 is compressed. Eventually, the lowermost land on pilot spool 60 will move past the lower edge of radial passage 43, thus communicating outlet 34 to the pilot chamber 58 and enabling normal pilot pressure operation of the main valve member. However, in a no pressure or low pressure situation, the pilot valve member 60 will continue moving upwards as solenoid current is increased until spring guide 68 engages the axial facing end wall 69 of bore 38, thus limiting further extension of spring 70. If solenoid current further increases, then the pilot valve member will separate or disengage from spring guide 68 so that further upwards movement is not effected by the bias of spring 70. This further upwards movement of pilot valve member 60 further compresses spring 82 and opens main valve member 16 because spring 82 has sufficient preload to overcome the seal friction forces which tend to resist movement of main valve member 16.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A pilot operated control valve comprising:
    a housing defining an inlet and an outlet;
    a main valve member movable in the housing and cooperating therewith to define a pilot chamber, pressure in the pilot chamber acting directly on the main valve member to move it to control fluid communication between the inlet and the outlet, the main valve member and the housing cooperating to define a damping chamber therebetween;
    a damping orifice communicating the damping chamber with the pilot chamber, the damping orifice comprising a single passage which extends through a portion of the main valve member, there being no other passage communicated directly with the damping chamber; and
    pilot valve means for controlling the pilot pressure, the pilot valve means including a pilot valve member movable with respect to the main valve member.

2. The control valve of claim 1, wherein:
    the housing defines a valve bore therein with a larger diameter portion and a smaller diameter portion joined by an annular shoulder; and
    the main valve member comprises a cylindrical body with a larger diameter portion and a smaller diameter portion joined by an annular wall, the larger diameter body portion being slidably and sealingly received in the larger diameter valve bore portion and the smaller diameter body portion being slidably and sealingly received in the smaller diameter bore portion, the shoulder, the wall, the large diameter bore portion and the smaller diameter body portion cooperating to enclose the damping chamber therebetween.

3. The control valve of claim 2, wherein:
    the damping orifice extends radially through the smaller diameter body portion of the main valve member.

4. The control valve of claim 1, further comprising:
    a resilient means connected between the pilot and main valve members so that upon movement of the pilot valve member, a mechanical force is applied via the resilient means to the main valve member, said mechanical force tending to move to the main valve member so as to follow the movement of the pilot valve member.

5. The control valve of claim 1, wherein the pilot valve means comprises:
    a pilot passage extending through the main valve member for communicating the outlet with the pilot chamber; and
    a land carried on the pilot valve member, the land being slidably received by the main valve member and movable therein to control fluid communication through the pilot passage.

6. The control valve of claim 5, wherein:
    the main valve member encloses an inlet chamber communicated with the inlet; and
    the pilot passage is comprised of separate first and second passages extending through the main valve member between the pilot chamber and the inlet chamber, and a third passage intersecting the first passage and communicating the first passage with the outlet, the land being movable to open and close communication between the third passage and the inlet chamber via a portion of the first passage.

7. The control valve of claim 6, wherein:
    the pilot valve member includes at least one further land, said at least one further land being received by the first passage and slidably and sealingly engaging a wall of the first passage to close communication between the third passage and the pilot chamber via the first passage.

8. The control valve of claim 7, wherein:
    the first passage extends along a central axis of the main valve member.

9. The control valve of claim 6, wherein:
    the second passage is spaced apart from and extends generally parallel to the first passage.

10. A pilot operated control valve comprising:
    a housing defining an inlet and an outlet;

a main valve member movable in the housing and cooperating therewith to define a pilot chamber, the main valve member being movable in response to pressure in the pilot chamber to control fluid communication between the inlet and the outlet;

pilot valve means for controlling the pilot pressure, the pilot valve means including a pilot valve member movable with respect to the main valve member;

a first spring coupled between the housing and the pilot valve member and biased to urge the pilot valve member and the main valve member in a direction closing communication between the inlet and the outlet;

a second spring coupled between the pilot valve member and the main valve member and biased to urge the main valve member in a direction which opens communication between the inlet and outlet;

a third spring coupled between the pilot valve member and the main valve member and biased to urge the main valve member in a direction which closes communication between the inlet and the outlet;

a spring guide coupled to the third spring and engageable with the pilot valve member to transmit forces between the pilot valve member and the main valve member; and an abutment engageable with the spring guide to limit the motion thereof so that the pilot valve member disengages from the spring guide after the pilot valve member moves a predetermined distance.

11. The control valve of claim 10, wherein:
the abutment is formed by a surface of the main valve member.

12. A pilot operated control valve comprising:
a housing defining an inlet and an outlet;
a main valve member movable in the housing and cooperating therewith to define a pilot chamber, the main valve member being movable in response to pressure in the pilot chamber to control fluid communication between the inlet and the outlet, the main valve member and the housing cooperating to define a damping chamber therebetween, the main valve member enclosing an inlet chamber communicated with the inlet;

pilot valve means for controlling the pilot pressure, the pilot valve means including a pilot valve member movable with respect to the main valve member, the pilot valve means comprising a pilot passage extending through the main valve member for communicating the outlet with the pilot chamber, and a land carried on the pilot valve member, the land being slidably received by the main valve member and movable therein to control fluid communication through the pilot passage;

a damping orifice communicating the damping chamber with the pilot chamber; and the pilot passage is comprised of separate first and second passages extending through the main valve member between the pilot chamber and the inlet chamber, and a third passage intersecting the first passage and communicating the first passage with the outlet, the land being movable to open and close communication between the third passage and the inlet chamber via a portion of the first passage.

13. The control valve of claim 12, wherein:
the pilot valve member includes at least one further land, said at least one further land being received by the first passage and slidably and sealingly engaging a wall of the first passage to close communication between the third passage and the pilot chamber via the first passage.

14. The control valve of claim 13, wherein:
the first passage extends along a central axis of the main valve member.

15. The control valve of claim 12, wherein:
the second passage is spaced apart from and extends generally parallel to the first passage.

* * * * *